United States Patent
Ur-Rehman et al.

(10) Patent No.: US 10,455,845 B2
(45) Date of Patent: *Oct. 29, 2019

(54) DAIRY COMPOSITIONS AND METHOD OF MAKING

(71) Applicant: fairlife, LLC, Chicago, IL (US)

(72) Inventors: Shakeel Ur-Rehman, Naperville, IL (US); John M. Dunker, Colorado Springs, CO (US); Michael J. McCloskey, Demotte, IN (US); Timothy J. Gomez, Kearney, MO (US); Richard J. Seguin, Amarillo, TX (US)

(73) Assignee: fairlife, LLC, Chicago, IL (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/369,720

(22) Filed: Dec. 5, 2016

(65) Prior Publication Data

US 2017/0094987 A1   Apr. 6, 2017

Related U.S. Application Data

(63) Continuation of application No. 13/952,642, filed on Jul. 28, 2013, now Pat. No. 9,538,770, which is a continuation of application No. 11/641,468, filed on Dec. 18, 2006, now abandoned, which is a continuation-in-part of application No. 10/229,462, filed on Aug. 27, 2002, now Pat. No. 7,169,428.

(51) Int. Cl.
| | |
|---|---|
| *A23C 3/00* | (2006.01) |
| *A23C 9/00* | (2006.01) |
| *B01D 61/00* | (2006.01) |
| *A23C 9/12* | (2006.01) |
| *A23C 9/142* | (2006.01) |
| *A23C 9/15* | (2006.01) |
| *A23C 9/123* | (2006.01) |

(52) U.S. Cl.
CPC .......... *A23C 9/1206* (2013.01); *A23C 9/1238* (2013.01); *A23C 9/1422* (2013.01); *A23C 9/1427* (2013.01); *A23C 9/1512* (2013.01); *A23C 2210/206* (2013.01)

(58) Field of Classification Search
CPC ... A23C 9/1206; A23C 9/1238; A23C 9/1422; A23C 9/1427; A23C 9/1512; A23C 2210/206
USPC ..... 426/34, 41, 42, 478, 490, 491, 492, 580; 210/650
See application file for complete search history.

(56) References Cited

U.S. PATENT DOCUMENTS

| | | |
|---|---|---|
| 4,529,611 A | 7/1985 | Uiterwaal |
| 5,616,249 A | 4/1997 | Hodgdon |
| 5,685,990 A | 11/1997 | Saugmann et al. |
| 5,888,401 A | 3/1999 | Nguyen |
| 5,985,339 A | 11/1999 | Kamarei |
| 6,251,459 B1 | 6/2001 | Schroder |
| 6,399,140 B1 | 6/2002 | Allen et al. |
| 6,478,969 B2 | 11/2002 | Brantley et al. |
| 6,881,428 B2 | 4/2005 | Lange |
| 7,169,428 B2 | 1/2007 | Dunker et al. |
| 7,829,130 B2 | 11/2010 | Tossavainen et al. |
| 2003/0059512 A1 | 3/2003 | Kopf et al. |
| 2005/0196508 A1 | 9/2005 | Wang |
| 2005/0214409 A1 | 9/2005 | Tossavainen et al. |

FOREIGN PATENT DOCUMENTS

| | | |
|---|---|---|
| DE | 2354475 A1 | 5/1974 |
| JP | 06-303900 A | 11/1994 |
| WO | WO-9322037 A1 | 11/1993 |
| WO | WO-99/04903 A1 | 2/1999 |
| WO | WO-99/37162 A1 | 7/1999 |
| WO | WO-99/40798 A1 | 8/1999 |
| WO | WO-00/29100 A1 | 5/2000 |
| WO | WO-00/45643 | 8/2000 |
| WO | WO-01/03515 A1 | 1/2001 |
| WO | WO-01/93689 A1 | 12/2001 |
| WO | WO-03/008077 A2 | 1/2003 |
| WO | WO-03/094623 A1 | 11/2003 |

OTHER PUBLICATIONS

Hinrichs, J., UHT Processed Milk Concentrates, Lait 80 (2000), pp. 15-23.
European Search Report, dated Sep. 26, 2005, (5 pages).
Tamime et al., Yoghurt Science and Technology, 1985, pp. 26,33,67,68,69,369,and 370.
Tamime et al., Yoghurt Science and Technology, 1985, Pergamon Press, pp. 7-8.
Winton et al., The Structure and Composition of Foods, 1937, vol. III, p. 47, Wiley & Sons, Inc., New York.

*Primary Examiner* — Leslie A Wong
(74) *Attorney, Agent, or Firm* — Winstead PC

(57) ABSTRACT

The invention relates to a method of separating components from milk and utilizing the separated components to form blended dairy compositions. The present invention relates to nutritional milk compositions and products which are designed to include per serving size a specified percentage range of one or more components separated from milk. The compositions of the present invention can optionally include non-essential but nutritionally functional components.

12 Claims, 3 Drawing Sheets

DAIRY COMPOSITIONS AND METHOD OF MAKING

CROSS-REFERENCE TO RELATED APPLICATIONS

This application is a continuation of application Ser. No. 13/952,642, filed Jul. 28, 2013, now U.S. Pat. No. 9,538,770, which is a continuation of application Ser. No. 11/641,468, filed Dec. 18, 2006, now abandoned, which is a continuation-in-part of application Ser. No. 10/229,462, filed Aug. 27, 2002, now U.S. Pat. No. 7,169,428, all of which are incorporated by reference as if fully set forth herein.

FIELD OF THE INVENTION

This invention relates to methods for separating components from milk, an apparatus for separating milk into individual components and compositions prepared from the separated components.

BACKGROUND OF THE INVENTION

Nutrition is one of the cornerstones of health, well-being, and the prevention of numerous chronic diseases. Nutritional products play an important role in these areas and attempts to provide readily available and convenient nutritional products to the general public has been a major focus in recent years. To remain healthy one must receive essential nutrients which are indispensable to human nutrition. Essential nutrients include both macronutrients, such as fats, carbohydrates and proteins, and micronutrients, such as vitamins and minerals (including trace elements and electrolytes).

Milk products constitute a significant portion of the overall diet or calorie consumption of human beings. As such, milk products play a major role in maintaining the health of the public. Nutritionally optimal milk products will have a positive effect on the nutrition and the health of the public. Concentration of macronutrients in any given milk product will often depend on the nature of the product and the desirable profile developed by the manufacturer.

For example, bovine milk contains about 87 wt % water, about 3 wt % protein, about 0.65 wt % whey (soluble proteins), about 4.5 to 5.0 wt % lactose, 3 to 4 wt % milk fat, 0.3 to 0.7 wt % mineral salts plus a variety of water and fat soluble vitamins, lactic and citric acids, urea, free amino acids and polypeptides. One or more of these components may be separated from milk and then may be optionally combined in a variety of combinations to produce various blended compositions. For example, in the manufacture of cottage cheese or casein, milk fat is first separated centrifugally (as cream) and the casein fraction of the milk is then precipitated at its isoelectric point by the addition of acid. The remainder of the original milk, containing all of the other components listed above, is called whey or milk serum, i.e., milk, from which the casein and a majority of the milk fat has been removed is referred to as whey or milk serum.

Whey (or milk serum) in turn can be subjected to filtration to produce a retentate and permeate that can be incorporated into a food product, like a beverage or dry food. For example, raw milk has been filtered to produce a substantially pure dairy water that can be incorporated into a beverage or dairy product for consumption, the dairy water being substantially pure and free of the major nutritional components present in the original raw milk.

It is desirable to exploit the nutritional advantages present in milk by separating milk into its individual components and to produce dairy compositions suitable for consumption by using these individual components in food products. In addition, there is a need in the dairy industry to design dairy compositions that can meet the nutritional requirements of individual groups of the human population such as athletes, lactating women, elderly persons, children, lactose-intolerant populations and diabetics.

SUMMARY OF THE INVENTION

The invention provides methods for the separation of milk components comprising the sequential steps involving membrane-based, chromatographic and density-based separation processes.

The invention also provides methods of making dairy compositions from fractionated milk components.

The invention further provides dairy compositions that are prepared from fractionated milk components derived by the methods of the invention.

Figure 1:
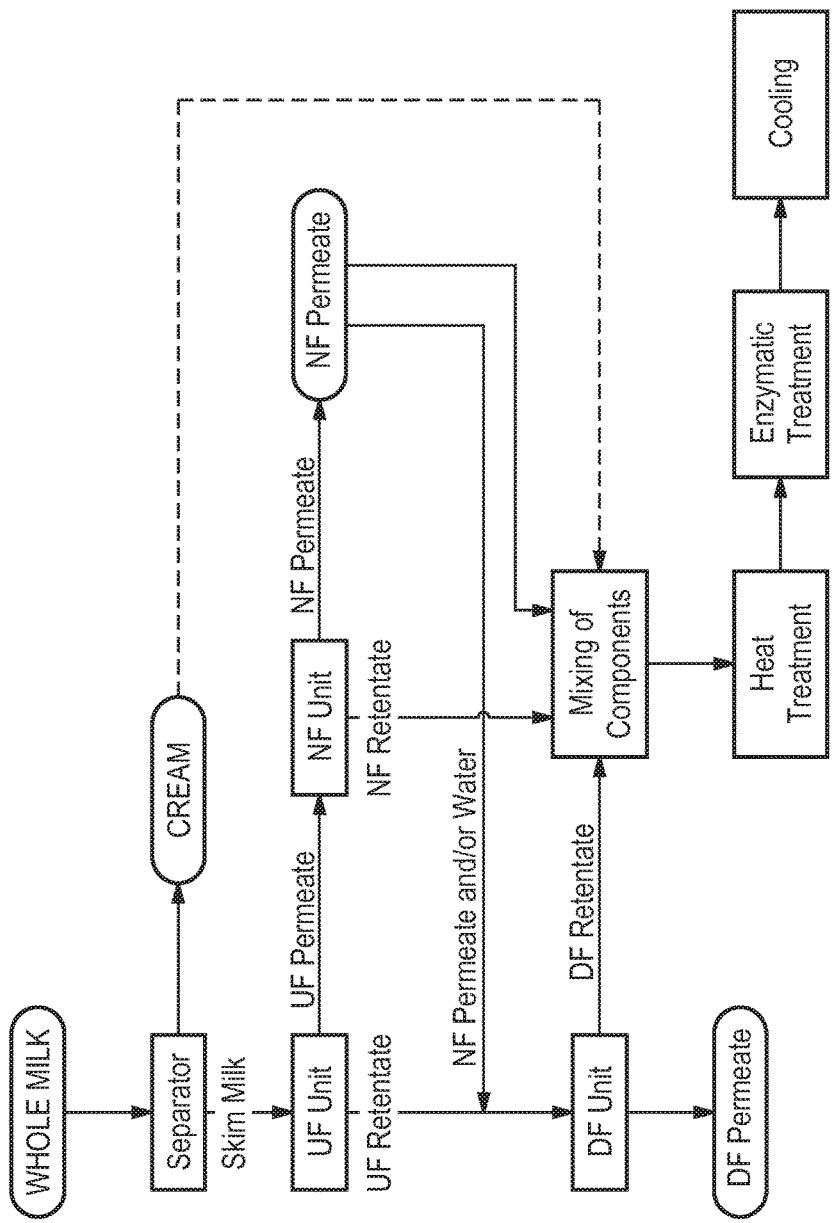
FIG. 1 illustrates a first method of separating milk components according to the invention and the subsequent mixing of the separated fractions and product processing.

While the invention is susceptible to various modifications and alternative forms, specific embodiments are shown by way of example in the drawings and are described in detail herein. It should be understood, however, that the invention is not intended to be limited to the particular forms disclosed. Rather, the invention covers all modifications, equivalents, and alternatives falling within the spirit and scope of the invention as defined by the appended claims.

DETAILED DESCRIPTION OF ILLUSTRATIVE EMBODIMENTS

The present invention relates to nutritional milk compositions and milk products which are designed to include specific components of milk. The compositions of the present invention can optionally include non-essential, but nutritionally functional components. As used herein, the terms "components of milk" or "milk components" are intended to refer to individual components of milk such as, but not limited to, butter fat, milk protein, non-protein nitrogen, lactose and minerals. All percentages expressed herein are weight percentages (wt %), unless indicated otherwise.

As used herein, the terms "dairy products" or "dairy compositions" refer to products or compositions comprising one or more milk components.

The complete nutritional milk compositions of the present invention can be provided as unflavored milks, flavored milks, ice creams, yogurts, cheeses, specialized milk powders or any other nutritional product that can be prepared from milk or milk components.

As used herein the term "milk" includes fat-free milk, low fat milk, full fat milk, lactose-free milk (produced by hydrolyzing the lactose by lactase enzyme to glucose and galactose, or by other methods such as nanofiltration, electrodialysis, ion exchange chromatography and centrifugation technology), concentrated milk or dry milk. Fat-free milk is nonfat or skim milk product. Low-fat milk is typically defined as milk that contains from about 1% to about 2% fat. Full fat milk often contains about 3.25% fat. As used herein, the term "milk" is also intended to encompass milks from animal and plant sources. Animal sources of milk include, but are not limited to, human, cow, sheep, goat, buffalo, camel, llama, mare and deer. Plant sources of milk include, but are not limited to, milk extracted from soy bean. In addition, the term "milk" refers to not only whole milk, but also skim milk or any liquid component derived therefrom. By "whey" or "milk serum" is meant the milk component remaining after all or a substantial portion of the milk fat and casein contained in milk are removed.

An embodiment of the invention provides a method for the separation of milk components starting with whole milk. Prior to entry into the membrane filtration system, the whole milk may be optionally passed through a mechanical separator in order to separate the cream from the remainder of the milk, or a microfiltration (MF) unit to remove fat. The separated cream is stored for future use. In certain embodiments of the invention the whole milk passes directly into the membrane systems without prior separation of the cream.

According to FIG. 1, the skim milk is passed through an ultrafiltration (UF) membrane unit to produce a UF permeate component and a UF retentate component. In certain embodiments, the ultrafiltration step is performed using a membrane filtration system having a molecular weight cut-off of about 8-10 kDa at pressures ranging from about 45 to about 150 psi. In the embodiment of the invention shown in FIG. 1, the UF permeate is passed through a nanofiltration (NF) membrane unit to produce a NF permeate and a NF retentate. In certain aspects of the invention, the nanofiltration step is carried out using a membrane filtration system having a molecular weight cut-off of about 500-1000 Da at pressures ranging from about 150 to about 600 psi. The NF permeate and NF retentate may be stored for future use.

In certain embodiments of the invention, a microfiltration (MF) step is either substituted in place of the ultrafiltration step, or is introduced prior to the ultrafiltration step. The microfiltration step is performed using a membrane filtration system having a molecular weight cut-off ranging from between 10 kDa to 200 kDa at pressures ranging from 15 to 21 psi.

Where the microfiltration step is introduced prior to the ultrafiltration step, the permeate from the microfiltration step (MF permeate) is subjected to an ultrafiltration step, using a membrane filtration system having a molecular weight cut-off of about 10 kDa at pressures ranging from about 45 to about 150 psi.

Figure 2:
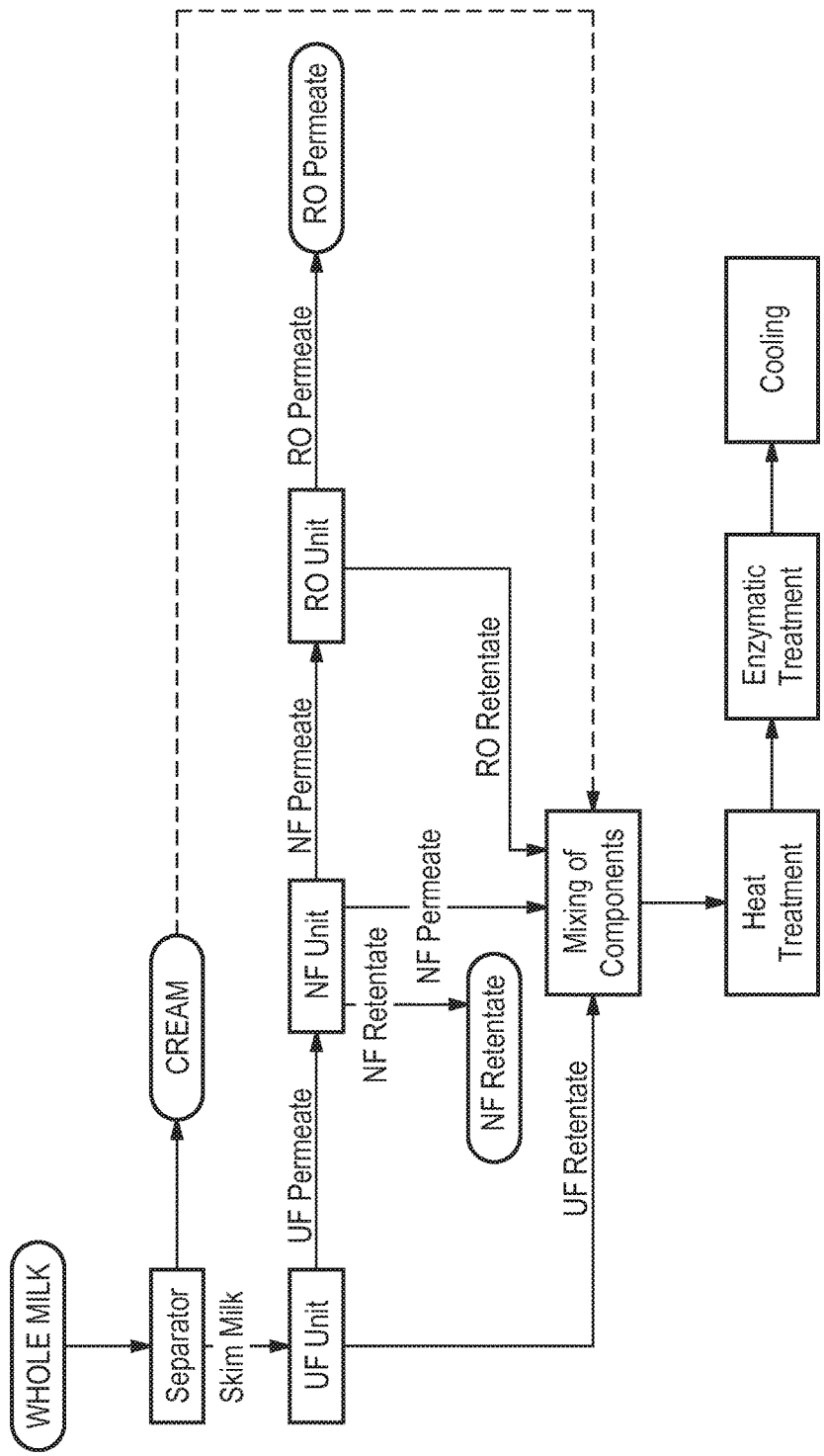
FIG. 2 illustrates a second method of separating milk components according to the invention and the subsequent mixing of the separated fractions and product processing.

In the embodiment of the invention depicted in FIG. 2, whole milk is separated into skim milk and cream, and the skim milk is subjected to a UF step and a NF step as discussed above. Following the NF step, the NF permeate is passed through a reverse osmosis system to produce a RO retentate and a RO permeate. The RO step employs a membrane filtration system having a molecular weight cut-off of about 100 Da at pressures ranging from about 450 to about 1500 psi. The RO permeate and RO retentate are stored for future use.

Figure 3:
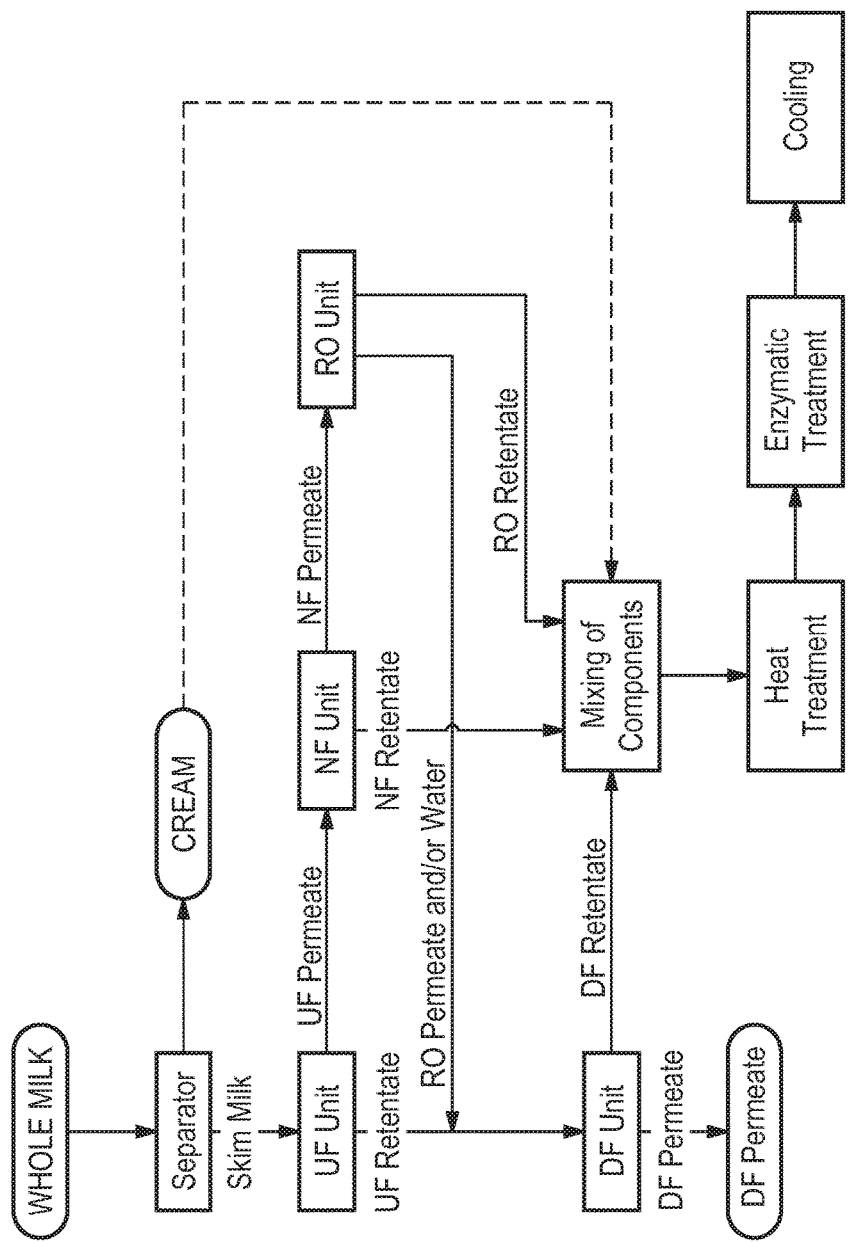
FIG. 3 illustrates a third method of separating milk components according to the invention and the subsequent mixing of the separated fractions and product processing.

In certain embodiments of the invention, diafiltration may be coupled with ultrafiltration for further removal of lactose, using injection of RO permeate or water and/or NF permeate. As depicted in FIG. 3, the UF retentate is mixed with water and/or NF permeate, and passed through a diafiltration (DF) membrane unit to produce a DF permeate and a DF retentate. The diafiltration step aids in further removal of lactose and employs a membrane filtration system having a molecular weight cut-off of about 10 kDa at pressures ranging from about 45 to about 150 psi. The DF permeate and DF retentate are stored for future use. In certain embodiments, the DF permeate is subjected to an additional diafiltration step either directly or following the addition of NF permeate or RO permeate.

An embodiment of the invention provides a method for preparing a dairy composition by initially separating individual milk components from milk, followed by subsequently mixing the separated components in the desired combination and ratio.

An aspect of the present invention provides dairy compositions that possess varying ranges of fat, protein, lactose, and minerals. In other words, an object of the present invention is to provide compositions that possess varying ranges of fat, protein, lactose and minerals derived from various milk components.

The compositions of the present invention are formulated such that they are derived by combining the various components separated from milk by the methods of the claimed invention.

In an embodiment of the invention, one or more milk components is combined to produce compositions of the present invention. There are several embodiments of the invention including, without limitation, the compositions discussed below.

Embodiments of the invention provide compositions prepared from one or more milk components selected from the group consisting of cream, skim milk, UF permeate, UF retentate, DF permeate, DF retentate, NF retentate, NF permeate, MF permeate, MF retentate, RO permeate and RO retentate. Varying predetermined amounts of each of the fractions generated by the methods of the invention may be combined to obtain compositions comprising desirable ranges of milk components such as lactose, fat, proteins and minerals.

In an exemplary embodiment of the invention, the NF retentate, DF retentate and NF permeate fractions, as shown in FIG. 1, are combined and heat-treated at 146° F. for 30 minutes (or any other equivalent time and temperature combination), following which the composition is cooled to below 42° F. After the cool-down process, the composition is treated with lactase enzyme at 42° F. to 45° F. for 6-10 hours. The enzyme-treated fraction is cooled to less than 40° F. for storage, packaging and shipment. In certain embodiments of the invention, the composition optionally comprises a cream fraction that has been separated from whole milk.

In another embodiment of the invention, the NF permeate, UF retentate and RO retentate fractions, as shown in FIG. 2, are combined and heat-treated at 146° F. for 30 minutes, following which the composition is cooled to below 42° F. After the cool-down process, the composition is treated with lactase enzyme at 42° F. to 45° F. for 6-10 hours. The enzyme-treated fraction is cooled to less than 40° F. for storage and shipment. In certain embodiments of the invention, the composition optionally comprises a cream fraction that has been separated from whole milk.

After the completion of lactose hydrolysis, the lactose-free milk is pasteurized, ultra-pasteurized or sterilized prior to packaging in retail containers. The lactose-free milks are subjected to microfiltration to remove bacteria, spores and lactase enzyme, followed by pasteurization. These processes ensure that the resulting products will have an extended shelf life.

In order to make reduced-fat or full fat lactose-free milks, lactose-hydrolyzed cream is separately heated at 200-212° F. for 1 minute and added to the skim lactose-free milks in which bacteria and lactase enzyme have been removed by microfiltration. The heat-treated cream and microfiltered lactose-free skim milks are mixed to obtain a desired composition and then pasteurized at 212° F. for 30 seconds before packaging into retail containers.

In another embodiment of the invention, the DF retentate, NF retentate and RO retentate fractions, as shown in FIG. 3, are combined and heat-treated at 146° F. for 30 minutes, following which the composition is cooled to below 42° F. After the cool-down process, the composition is treated with lactase enzyme at 42° F. to 45° F. for 6-10 hours. The enzyme-treated fraction is cooled to less than 40° F. for storage and shipment. In certain embodiments of the invention, the composition optionally comprises a cream fraction that has been separated from whole milk.

In yet another embodiment of the invention, the UF retentate and RO retentate fractions, as shown in FIG. 2, are combined and heat-treated at 146° F. for 30 minutes, following which the composition is cooled to below 42° F. After the cool-down process, the composition is treated with lactase enzyme at 42° F. to 100° F. for 1-8 hours. The enzyme-treated fraction is cooled to below 42° F. for storage and shipment. In certain embodiments of the invention, the composition optionally comprises a cream fraction that has been separated from whole milk.

In an embodiment of the invention, a low lactose composition is provided, comprising one or more milk components, wherein the concentration of lactose in said composition is lowered by non-enzymatic methods, for e.g., separation processes. In an embodiment of the invention, low lactose compositions of the invention are prepared using a membrane filtration process. In an embodiment of the invention, the low lactose compositions of the invention comprise from about 1 wt % to about 3 wt % of lactose. In an embodiment of the invention, the low lactose compositions of the invention comprise less than 2 wt % of lactose. As used herein, the term "low lactose composition" is intended to refer to compositions which comprise from about 1 wt % to about 3 wt % of lactose, and more preferably less than 2 wt % of lactose. As used herein, the terms "low lactose composition" and "low carbohydrate composition" are synonymous with one another.

The compositions of the present invention may be concentrated by any number of methods including but not limited to evaporation, and membrane processes like reverse osmosis, in order to provide the milk components in a concentrated composition or format. In other words, the compositions of the present invention are prepared from one or more milk components selected from the group consisting of butter fat, skim milk, MF permeate, MF retentate, UF permeate, UF retentate, DF permeate, DF retentate, NF retentate, NF permeate, RO permeate and RO retentate, and in certain embodiments of the invention, the compositions are concentrated by known methods in the art including, but not limited to, evaporation, to provide the milk components of the compositions in a more concentrated format.

Certain embodiments of the invention provide a dairy composition derived from milk components comprising from about 0.05 wt % to about 5.5 wt % butter fat, from about 3 wt % to about 10 wt % of protein, less than 1 wt % lactose and from about 0.65 wt % to about 2 wt % minerals.

An embodiment of the present invention further provides a dairy composition derived from milk components comprising from about 0.05 wt % to about 5.5 wt % butter fat, from about 3 wt % to about 10 wt % of protein, from about less than 1 wt % to about 10 wt % lactose and from about 0.65 wt % to about 2 wt % minerals.

The compositions of the present invention can be formulated into different types of dairy products. For example, the dairy product can be an unflavored or a flavored milk. Additionally, the dairy product can be a dairy drink, dairy beverage or a dairy cocktail. Such drinks, beverages or cocktails are products that contain the compositions in a diluted form. Such diluted forms can include, as nonlimiting examples, a fruit juice or a carbonated soda as a diluent combined with the compositions.

The compositions can also be frozen to yield an ice cream or other frozen desert. The ice creams can be formulated into a standard ice cream containing about 10 wt % milk fat, a premium ice cream containing about 15 wt % milk fat and a super premium ice cream containing about 17 wt % milk fat. Other milk fat levels are contemplated with the compositions. Additionally, non-dairy fats are also contemplated. Furthermore, other frozen deserts, such as sherbets, sundaes, or partially frozen deserts, such as milk shakes, may suitably be made from the compositions.

An embodiment of the invention provides a method of making a frozen confectionary product, such as ice cream, by subjecting whole milk to a lactose reduction step, followed by concentration of the low lactose or lactose-free material by reverse osmosis. In certain embodiments of the invention, the lactose is removed by hydrolysis using lactase enzyme.

The RO-concentrated material serves as the basis for a ice-cream mix that can be manipulated to change levels of various components such as sugars, proteins, fats, milk-solids not fat (MSNF) and total solids. The resulting ice cream made from RO-concentrated lactose-hydrolyzed whole milk does not require any extraneous sources of sugar, stabilizer or emulsifier.

In an embodiment of the invention, an ice cream mix (as set forth above) was formulated to contain about 8% protein, 6% fat and 10% sucrose. The reduction of protein was compensated for by adding polydextrans and corn syrup solids. The ice cream mix was frozen for 11 minutes to obtain a soft ice cream product.

Additionally, the compositions can be formulated into a yogurt. Yogurt is produced by culturing the compositions of the present invention with a bacterial culture such as lactic acid-producing bacteria, *Lactobacillus bulgaricus* and *Streptococcus thermophilus*. Yogurts prepared using the compositions of the present invention can be set yogurts where the fermentation occurs in the final retail container or stirred yogurts where the fermentation occurs in bulk prior to packaging. Furthermore, these yogurts can contain flavors or fruits, can be frozen to provide a frozen yogurt or can be in the form of a drinkable fluid to provide a drinkable yogurt.

The nanofiltration retentate fraction, which is a lactose-rich fraction, can be subjected to fermentation, and this fermented fraction can be used in the preparation of a yogurt or yogurt drinks composition. There are numerous advantages to performing the fermentation process on the NF retentate fraction rather than whole milk including, the need of less culture and time required for the fermentation of NF retentate relative to whole milk, ability to separate fermentation bacteria more easily from the NF retentate fraction, and the ability to store the fermented retentate for future use as needed.

The fermentation of the NF fraction is carried out by the addition of lactic acid-producing bacteria such as *Lactobacillus bulgaricus* and *Streptococcus thermophilus*. The bacteria from fermented NF retentate can be removed by ultrafiltration or microfiltration for future use and the bacteria free fermented NF retentate is used for making yoghurt drinks.

In an embodiment of the invention, the diafiltration retentate fraction is combined with cream, reverse osmosis retentate fraction and a fermented NF retentate fraction at a pH of less than 5. The mixture is placed in containers and incubated at 107.6° F. (42° C.) until a firm coagulum is formed.

The compositions of the present invention can be optionally fortified with a protein source, a mineral source, a carbohydrate source or a mixture. Examples of fortifying sources include sources of calcium, vitamin D and sources of protein. The protein source may be selected from a variety of materials, including without limitation, milk protein, whey protein, caseinate, soy protein, egg whites, gelatins, collagen and combinations thereof.

Included in the protein source are lactose-free skim milk, milk protein isolate, and whey protein isolate. It is also contemplated to use soy milk or other protein sources of vegetable origin with the present compositions. As used herein, "soy milk" or "milk from soy bean" refers to a liquid made by grinding dehulled soy beans, mixing with water, cooking and recovering the dissolved soy milk out of the beans. Such soy milk can be formed into a milk-like product, which has similar taste, texture and appearance to animal (dairy) milk, but is essentially free of animal (dairy) milk. Furthermore, a dairy-like product, which as used herein refers to a product having similar taste, texture and appearance to dairy products made from animal milk, but does not contain animal milk, can be made from such milk-like products. The carbohydrate source useful in the present invention may be selected from a wide variety of materials such as sucrose, corn syrup solids, glucose, fructose, maltodextrin and combinations thereof.

Artificial sweeteners such as saccharine, aspartame, asulfame K, sucralose and their combination, as well as others, may be incorporated to enhance the organoleptic and sweetness quality of the compositions. Various fiber sources may be included in the compositions of the present invention. These sources may be selected from such materials as oat fiber, soy fiber, guar gum, pectin, soy polysaccharides, gum arabic, hydrolyzed fibers and the like. Cellulose, hemicellulose, hydrocollides, methylcellulose, carboxymethyl cellulose and the like are contemplated. Also useful are fructo-oligosaccharides.

Compositions of the present invention can be formulated into a variety of different product forms. For example, forms can include, but are not limited to, high protein and fiber-containing, fat-free (skim), 1 wt % low fat, 2 wt % low fat, full fat (3.4 wt %), skim plus nonfat milk solids and lactose-free skim milks. Furthermore, where fat free (nonfat or skim) milk is used, the milk may be partially evaporated or has added nonfat milk solids to yield a product with a rich creamy taste. The compositions can be flavored with natural or artificial ingredients. Such ingredients may be combined with the compositions to form a substantially uniform flavored product or may be present in a non-uniform manner, such as fruit on the bottom of a yogurt composition. Non-limiting examples of flavored compositions include chocolate, strawberry, peach, raspberry, vanilla, banana, coffee, mocha and combinations thereof.

Other non-enzymatic methods of lowering lactose levels that are employed in certain embodiments of the invention include electrodialysis, ion exchange processes and centrifugation. The electrodialysis process involves the application of an electric current over a membrane, whereby lactose is separated from other dairy components using ion-specific membranes. Similarly, the ion exchange process takes advantage of specific electron charges inherent in lactose to separate this component from other dairy components.

In an embodiment of the invention, the processes of electrodialysis, ion exchange or centrifugation may be substituted in place of the nanofiltration step to aid in removal of lactose.

Electrodialysis is an electromembrane process in which ions are transported through ion permeable membranes from one solution to another under the influence of a potential gradient. The electrical charges on the ions allow them to be driven through the membranes fabricated from ion exchange polymers. Applying a voltage between two end electrodes generates the potential field required for this. Since the membranes used in electrodialysis have the ability to selectively transport ions having positive or negative charge and reject ions of the opposite charge, useful concentration, removal, or separation of electrolytes can be achieved by electrodialysis.

Ion exchange is a reversible chemical reaction wherein an ion (an atom or molecule that has lost or gained an electron and thus acquired an electrical charge) from solution is exchanged for a similarly charged ion attached to an immobile solid particle. These solid ion exchange particles are either naturally occurring inorganic zeolites or synthetically produced organic resins.

Skim milk permeate obtained during ultrafiltration of skim milk contains mostly lactose, water and minerals. The density of lactose is 1670 kg m$^{-3}$ compared to a milk mineral density of 2500 kg m$^{-3}$ at 15° C., a difference of 1830 kg m$^{-3}$ which is far higher than the density difference between milk and milk SNF (690 kg m$^{-3}$). The minerals from UF permeate can be separated by centrifugal force (greater than 5000 g). Lactose and water form a supernatant while the minerals will form a pellet. The pellet can be re-introduced into concentrated UF permeate of skim milk to reintroduce minerals in lactose-reduced milk compositions. The lactose-water supernatant is concentrated by reverse osmosis. The permeate obtained in this process is mixed with UF permeate of skim milk, which is then subjected to diafiltration. Alternately, the RO permeate derived from the lactose-water supernatant is used to blend mineralized UF permeate of skim milk into desired compositions.

In an embodiment of the invention, a centrifugation step is used in place of a nanofiltration step to separate lactose from UF permeate of skim milk.

In certain embodiments of the invention, the process steps of the invention are carried out in a unidirectional manner. An embodiment of the invention provides a single pass system where the flow of milk or separated components pass through a given membrane filtration system only once. An alternate embodiment of the invention provides a multi-pass system where all or a portion of a permeate fraction derived from a particular membrane filtration step is permitted to pass over the membrane unit from which the fraction was derived. A multi-pass system may comprise one or more additional passages of a fraction relative to a single pass system.

In an embodiment of the invention, the multi-pass system involves the passage of a previously-fractionated component such as a retentate fraction, over a membrane unit from which the fraction was derived. The purpose of such a multi-pass system is to facilitate the efficient recovery of nutrients from the various fractions. It should be noted that the multi-pass system of the claimed invention does not permit the mixing of fractions with one another during the component-separation process. Rather, in the multi-pass system, fractions that are derived from a particular membrane unit, are passed through the same membrane unit from which they were originally derived.

During the lactase treatment of the fractions generated by the methods of the invention, hydrolysis of lactose results in galactose and glucose. Therefore, the treatment of dairy compositions with lactase reduces the amount of lactose in the composition and can increase the sweetness of the composition. In order to provide a measurement of sweetness for dairy products, an objective scale has been devised whereby various sugars have been assigned an objective value of sweetness using sucrose as a standard. For example, sucrose (table sugar) is rated at a 100 rating and all other sweeteners are rated either more (fructose=110-180, aspartame=18000) or less (maltose=40, lactose=20, galactose=35, glucose=75). The hydrolysis of 30% of the lactose in milk (milk has approximately 4.7% lactose) results in an increase in the sweetness of the hydrolysed composition by an amount equivalent to 0.3% (w/v) of sucrose (Mahoney, R. R., 1992, Advanced Dairy Chemistry, Vol. 3, p. 108). Similarly, hydrolysis of 60%, 90% and 100% of milk lactose results in an increase in the sweetness of the hydrolysed composition by an amount equivalent to 0.6% (w/v), 0.9% (w/v) and 1% (w/v) of sucrose respectively.

Various non-nutritive components can be included in the compositions. For example, fillers, coloring agents, flavors, emulsifiers, sources of fat (e.g., vegetable oil) and the like are useful. Other nutritionally valuable, but non-essential components can be added, including choline, taurine, L-carnitine and the like. Combinations of these non-nutritive and non-essential components are contemplated.

Various nutraceuticals and phytochemicals can be incorporated into the compositions for their intended function. Furthermore, it is contemplated that the compositions can be used in other dairy products, such as but not limited to cheeses, creams, custards, and the like.

The compositions may be packaged for consumption and sale in an assembly comprising a gable-top carton, a plastic container, a glass container, a paper container, a cardboard container or a metal container.

WORKING EXAMPLES

Example 1

In an embodiment of the invention, the components of raw milk were separated out as follows. A milk separator (CMRP618-HGV, Alfa Laval) was used to perform cold bowl mechanical separation of milk into cream and skim milk by means of centrifugal forces at a temperature below 45° F. The processes of the invention are preferably carried out at a temperature of 42° F. or lower. In order to maintain the process temperature at the required temperature, diverter valves may be used in conjunction with the membrane filtration systems. These diverter valves are designed to divert the product back to the supply tank if temperatures exceed 45° F. when the temperature of the product exceeds the desired maximum. As a result, the product will not proceed to a forward flow until the product temperature is below 45° F.

The cream was heat-treated at 150° F. for 30 minutes, cooled to below 42° F. and transferred to a cold room (36° F.). Following the separation of cream, the skim milk was initially passed through an ultrafiltration system. The ultrafiltration system employed membrane filters having a molecular exclusion range of about 5000 to 10,000 daltons. The UF membrane filters (PTI) had a polysulfone/polypropylene support and a maximum pressure load of 150 psi. The skim milk was concentrated three-fold by multi-pass ultrafiltration to produce an ultrafiltration retentate (UF retentate) and an ultrafiltration permeate (UF permeate). The temperature of the concentrate was kept below 45° F. by circulating cold water in the jacket of the balance tank of the ultrafiltration unit.

The UF permeate was concentrated three- to four-fold by a nanofiltration system to yield a lactose-rich nanofiltration retentate (NF retentate) and a reduced-lactose nanofiltration permeate (NF permeate). The nanofiltration system employed membrane filters (Koch) having a molecular exclusion range of about 100 to 1000 daltons and a maximum pressure load of 600 psi.

The NF retentate was heat-treated at 146° F. for 30 minutes, cooled to below 42° F. and transferred to a cold room (36° F.). The NF permeate was concentrated two- to three-fold using a reverse osmosis system using membrane filters having a molecular exclusion range of about 100-180 daltons. The RO membrane filters (Osmonics) were made of a thin film composite polyester material and were capable of sustaining a maximum pressure load of 550 psi. The reverse osmosis retentate (RO retentate) was heat-treated at 146° F. for 30 minutes, cooled to below 42° F. and transferred to a cold room (36° F.). The RO permeate (also known as milk water) was set aside for future use as discussed below.

The UF retentate was mixed with water, RO permeate, NF permeate at 42° F. and the mixture was concentrated three-fold by dialfiltration to produce a diafiltered retentate (DF retentate I) and a diafiltered permeate (DF permeate I). In certain cases, a second dialfiltration step was employed to obtain a further reduction in the lactose content of the UF retentate. In the second diafiltration step, the DF retentate I was mixed with water, RO permeate or NF permeate at 42° F. to obtain a reconstituted diafiltered retentate, which was subsequently concentrated two-fold by dialfiltration to produce a retenate (DF Retentate II) and a permeate (DF permeate II). The double diafiltered DF retentate II was at 146° F. for 30 minutes, cooled to below 42° F. and transferred to a cold room (36° F.). The diafiltration system employed membrane filters having a molecular exclusion range of about 1000 to 10,000 daltons.

All heat-treated fractions were cooled to below 42° F. and stored at 36° F. for use in the preparation of blended dairy compositions.

Example 2

In another embodiment of the invention, raw milk was separated into skim milk and cream by a mechanical separator. The skim milk fraction was concentrated by ultrafiltration as discussed above to yield a UF retentate and a UF permeate. The UF permeate was concentrated by nanofiltration as discussed above to produce a NF permeate and a NF retentate. A portion of the NF permeate was heat-treated at 146° F. for 30 minutes, cooled to below 42° F. and stored at 36° F. for use in the preparation of blended dairy compositions. Another portion of the NF permeate was mixed with the UF retentate and concentrated by a diafiltration system to yield a DF retentate and a DF permeate. In certain aspects of the invention, an optional second DF step was used to further reduce the lactose of the starting material i.e, UF retentate.

Example 3

In an embodiment of the invention, raw milk was separated into skim milk and cream. The skim milk fraction was concentrated by ultrafiltration as discussed above to yield a UF retentate and a UF permeate. The UF permeate was concentrated by nanofiltration as discussed above to produce a NF permeate and a NF retentate. A portion of the NF permeate was heat-treated at 146° F. for 30 minutes, cooled to below 42° F. and stored at 36° F. for use in the preparation of blended dairy compositions. The NF retentate was heat-treated at 146° F. for 30 minutes, cooled to below 42° F. and transferred to a cold room (36° F.). Another portion of the NF permeate was concentrated two- to three-fold using a reverse osmosis system. The RO retentate was heat-treated at 146° F. for 30 minutes, cooled to below 42° F. and transferred to a cold room (36° F.). The RO permeate was set aside for future use.

Example 4

An embodiment of the invention provides a blended dairy composition comprising one or more milk components such as UF/DF retentate (DF retentate I or DF retentate II), NF retentate and NF permeate. The UF/DF retentate is a key component around which blended compositions are based. This component contains the bulk of the proteins necessary for the finished product. The NF retentate component is largely the source of the minerals and lactose of the finished product, and is also the bearer of the greatest flavor. The RO retentate is the main source of the milk minerals/water necessary to standardize the solids-not-fat fraction of the product to the standard of identity for milk.

In certain aspects of the invention, cream (separated from raw milk) can be optionally added to the composition. Following the blending of the milk components, the composition was pasteurized at 146° F. for 30 minutes or 165° F. for 16 seconds. Following pasteurization, the composition was cooled to around 45° F. and treated with the enzyme lactase. After lactase treatment, the final product was typically packaged in pre-sanitized plastic bottles and transferred to cold rooms (36° F.) for storage until shipment in insulated containers. In alternate embodiments of the invention, the composition may undergo lactase treatment prior to pasteurization.

Example 5

A further embodiment of the invention provides a blended dairy composition comprising one or more milk components such as UF/DF retentate (DF retentate I or DF retentate II), NF retentate and RO retentate. In certain aspects of the invention, cream (separated from raw milk) can be optionally added to the composition. Following the blending of the milk components, the composition was pasteurized at 146° F. for 30 minutes or 165° F. for 16 seconds. Following pasteurization, the composition was cooled to around 45° F. and treated with the enzyme lactase. After lactase treatment, the final product was typically packaged in pre-sanitized plastic bottles and transferred to cold rooms (36° F.) for storage until shipment in insulated containers. In alternate embodiments of the invention, the composition may undergo lactase treatment prior to pasteurization.

Example 6

An embodiment of the invention provides a blended dairy composition comprising one or more milk components such as UF/DF retentate (DF retentate I or DF retentate II), RO retentate and RO permeate. In certain aspects of the invention, cream (separated from raw milk) can be optionally added to the composition. Following the blending of the milk components, the composition was pasteurized at 146° F. for 30 minutes or 162° F. for 16 seconds. Following pasteurization, the composition was cooled to around 45° F. and treated with the enzyme lactase. After lactase treatment, the final product was typically packaged in pre-sanitized plastic or metal tanks/containers until total hydrolysis of lactose is achieved, followed by milk pasteurization treatment. The pasteurized product is transferred to cold rooms (36° F.) for storage until shipment in insulated containers or retail packaging. In alternate embodiments of the invention, the composition may undergo lactase treatment prior to pasteurization.

Example 7

Another embodiment of the invention provides a blended dairy composition comprising one or more milk components such as UF retentate, RO retentate and NF permeate. In certain aspects of the invention, cream (separated from raw milk) can be optionally added to the composition. Following the blending of the milk components, the composition was pasteurized at 146° F. for 30 minutes or 165° F. for 16 seconds. Following pasteurization, the composition was cooled to around 45° F. and treated with the enzyme lactase. After lactase treatment, the final product was typically packaged in pre-sanitized plastic bottles and transferred to cold rooms (36° F.) for storage until shipment in insulated containers. In alternate embodiments of the invention, the composition may undergo lactase treatment prior to pasteurization.

Example 8

Table 1 represents a composition profile for raw milk and the milk components obtained by the methods of the claimed invention. The numbers set forth in Table 1 represent the results of multiple trials.

TABLE 1

| Product | Total Solids (%) | Protein (%) | Lactose (%) | Fat (%) | Minerals (%) |
|---|---|---|---|---|---|
| Whole Milk | 13.09 ± 0.05 | 3.54 ± 0.05 | 4.62 ± 0.09 | 4.05 ± 0.09 | 0.70 ± 0.05 |
| Skim Milk | 9.54 ± 0.11 | 3.65 ± 0.10 | 4.80 ± 0.05 | 0.13 ± 0.03 | 0.74 ± 0.04 |
| Cream | 48.26 ± 0.25 | 1.95 ± 0.06 | 2.44 ± 0.32 | 43.33 ± 0.29 | 0.35 ± 0.06 |
| UF retentate | 17.68 ± 0.78 | 10.23 ± 0.53 | 4.98 ± 0.22 | 0.35 ± 0.01 | 1.17 ± 0.04 |

TABLE 1-continued

| Product | Total Solids (%) | Protein (%) | Lactose (%) | Fat (%) | Minerals (%) |
|---|---|---|---|---|---|
| (3X) UF permeate | 5.38 ± 0.21 | 0.17 ± 0.01 | 4.85 ± 0.05 | 0.00 | 0.40 ± 0.08 |
| DF retentate I (3X) | 13.68 ± 0.18 | 10.44 ± 0.23 | 1.01 ± 0.30 | 0.42 ± 0.08 | 0.84 ± 0.02 |
| DF permeate I | 1.66 ± 0.08 | 0.05 ± 0.01 | 1.04 ± 0.26 | 0.00 | 0.16 ± 0.01 |
| NF retentate (3X) | 10.49 ± 0.64 | 0.20 ± 0.03 | 9.49 ± 0.74 | 0.00 | 0.63 ± 0.06 |
| NF permeate | 0.72 ± 0.08 | 0.11 ± 0.04 | 0.40 ± 0.11 | 0.00 | 0.14 ± 0.06 |
| RO retentate (3.5X) | 2.00 ± 0.17 | 0.13 ± 0.03 | 1.22 ± 0.03 | 0.00 | 0.14 ± 0.04 |
| RO permeate | 0.00 | 0.00 | 0.00 | 0.00 | 0.00 |

Example 9

The composition profile of raw whole milk and the components obtained from raw whole milk using the methods of the invention are summarized in Table 2. In this instance, the whole milk was not subjected to a separation step to remove cream, prior to the separation of the milk components.

TABLE 2

| Product | Fat (%) | Protein (%) | Non-protein nitrogen (%) | Lactose (%) | Minerals (%) |
|---|---|---|---|---|---|
| Whole Milk | 3.0-5.0 | 2.8-4.5 | 0.18-0.21 | 4.5-5.5 | 0.65-1.0 |
| UF retentate | 9.0-18.0 | 8.0-16.0 | 0.20-0.25 | 4.4-6.0 | 1.2-2.0 |
| UF permeate | 0.0-0.025 | 0.1-0.3 | 0.15-0.20 | 4.0-5.6 | 0.4-0.75 |
| DF retentate I | 9.0-18.0 | 8.0-16.0 | 0.10-0.15 | 0.5-3.0 | 0.90-1.90 |
| DF permeate I | 0.0-0.025 | 0.1-0.2 | 0.1-0.15 | 2.0-3.0 | 0.2-0.4 |
| NF retentate | 0.0-0.075 | 0.1-0.3 | 0.1-0.2 | 8-17 | 0.6-1.5 |
| NF permeate | 0.0 | 0.05-0.15 | 0.1-0.15 | 0.0-0.1 | 0.05-0.15 |
| RO retentate | 0.0 | 0.1-0.20 | 0.1-0.2 | 0.0-0.3 | 0.20-0.66 |
| RO permeate | 0.0 | 0.0 | 0.01-0.05 | 0.0 | 0.0 |

Example 10

The composition profile of skim milk and the components obtained from skim milk using the methods of the invention are summarized in Table 3. In this instance, whole milk was subjected to a separation step to remove cream, prior to the separation of the milk components.

TABLE 3

| Product | Fat (%) | Protein (%) | Non-protein nitrogen (%) | Lactose (%) | Minerals (%) |
|---|---|---|---|---|---|
| Whole Milk | 3.0-5.0 | 2.8-4.5 | 0.18-0.21 | 4.5-5.5 | 0.65-1.0 |
| Skim Milk | 0.05-0.2 | 2.9-4.7 | 0.18-0.21 | 4.6-5.6 | 0.65-1.0 |
| Cream | 32.0-48.0 | 1.5-2.3 | 0.11-0.14 | 1.9-3.0 | 0.30-0.40 |
| UF retentate | 0.15-0.70 | 8.0-16.0 | 0.20-0.25 | 4.4-6.0 | 1.0-1.90 |
| UF permeate | 0.0-0.025 | 0.1-0.3 | 0.15-0.20 | 4.0-5.6 | 0.4-0.75 |
| DF retentate I | 0.15-0.80 | 8.0-16.0 | 0.10-0.15 | 0.5-3.0 | 0.80-1.2 |
| DF permeate I | 0.0-0.025 | 0.1-0.2 | 0.1-0.15 | 2.0-3.0 | 0.2-0.4 |
| NF retentate | 0.0-0.075 | 0.1-0.3 | 0.1-0.2 | 8-17 | 0.6-1.5 |
| NF permeate | 0.0 | 0.05-0.15 | 0.1-0.15 | 0.0-0.1 | 0.05-0.15 |
| RO retentate | 0.0 | 0.1-0.20 | 0.1-0.2 | 0.0-0.3 | 0.20-0.66 |
| RO permeate | 0.0 | 0.0 | 0.01-0.05 | 0.0 | 0.0 |

Example 11

Table 4 represents the composition profile of a blended composition having approximately 5% protein prepared as discussed in Example 5. UF-DF retentate denotes the retentate fraction of milk that has passed through the UF step and at least one DF step.

TABLE 4

| Ingredient | UF-DF Skim Milk retentate | NF-retentate | RO-retentate | Final Blend |
|---|---|---|---|---|
| Total Solids (%) | 13.65 | 12.07 | 2.01 | 8.15 |
| Protein (%) | 10.25 | 0.20 | 0.10 | 5.13 |
| Lactose (%) | 1.097 | 10.7 | 1.299 | 1.83 |
| Fat (%) | 0.9 | 0.0 | 0.0 | 0.44 |
| Minerals (%) | 1.10 | 0.40 | 0.52 | 0.79 |
| Solids-not-fat (SNF) (%) | 12.75 | 12.07 | 2.01 | 7.77 |

Example 12

Table 5 represents the composition profile of a blended composition having approximately 5.7% protein prepared as discussed in Example 5.

TABLE 5

| Ingredient | UF-DF Skim milk retentante | NF-retentate | RO-retentate | Final Blend |
|---|---|---|---|---|
| Total Solids (%) | 14.30 | 11.90 | 2.39 | 9.05 |
| Protein (%) | 10.2 | 0.20 | 0.10 | 5.70 |
| Lactose (%) | 1.95 | 10.1 | 1.5 | 1.79 |
| Fat (%) | 0.80 | 0.0 | 0.0 | 0.44 |
| Minerals | 1.17 | 0.40 | 0.57 | 0.79 |
| Solids-not-fat (SNF) (%) | 13.50 | 11.90 | 2.39 | 8.61 |

Example 13

Table 6 shows the quantity of milk components used in the preparation of a 4% protein, no fat (skim), low carbohydrate blended composition.

TABLE 6

| Ingredient | UF-DF Skim Milk retentate (lbs) | NF-retentate (lbs) | RO-retentate (lbs) | Cream (lbs) |
|---|---|---|---|---|
| Quantity | 37.64 | 3.17 | 59.19 | 0.0 |

Example 14

Table 7 shows the quantity of milk components used in the preparation of a 4% protein, low fat, low carbohydrate blended composition.

TABLE 7

| Ingredient | UF-DF Skim Milk retentate (lbs) | NF-retentate (lbs) | RO-retentate (lbs) | Cream (lbs) |
|---|---|---|---|---|
| Quantity | 37.64 | 3.00 | 54.81 | 4.55 |

Example 15

Table 8 shows the quantity of milk components used in the preparation of a 4% protein, full fat, low carbohydrate blended composition.

TABLE 8

| Ingredient | UF-DF Skim Milk retentate (lbs) | NF-retentate (lbs) | RO-retentate (lbs) | Cream (lbs) |
|---|---|---|---|---|
| Quantity | 37.64 | 1.95 | 53.12 | 7.386 |

Example 16

Table 9 shows the quantity of milk components used in the preparation of a 4.5% protein, no fat, low carbohydrate blended composition.

TABLE 9

| Ingredient | UF-DF Skim Milk retentate (lbs) | NF-retentate (lbs) | RO-retentate (lbs) | Cream (lbs) |
|---|---|---|---|---|
| Quantity | 42.60 | 3.27 | 54.31 | 0.0 |

Example 17

Table 10 shows the quantity of milk components used in the preparation of a 4.5% protein, low fat, low carbohydrate blended composition.

TABLE 10

| Ingredient | UF-DF Skim Milk retentate (lbs) | NF-retentate (lbs) | RO-retentate (lbs) | Cream (lbs) |
|---|---|---|---|---|
| Quantity | 42.60 | 3.27 | 49.76 | 4.55 |

Example 18

Table 11 shows the quantity of milk components used in the preparation of a 4.5% protein, full fat, low carbohydrate blended composition.

TABLE 11

| Ingredient | UF-DF Skim Milk retentate (lbs) | NF-retentate (lbs) | RO-retentate (lbs) | Cream (lbs) |
|---|---|---|---|---|
| Quantity | 42.60 | 2.28 | 47.73 | 7.386 |

Example 19

Table 12 shows the quantity of milk components used in the preparation of a 8% protein, no fat, low carbohydrate blended composition.

TABLE 12

| Ingredient | UF-DF Skim Milk retentate (lbs) | NF-retentate (lbs) | RO-retentate (lbs) | Cream (lbs) |
|---|---|---|---|---|
| Quantity | 76.82 | 10.27 | 13.01 | 0.0 |

Example 20

The ranges of components in the finished product, prior to enzyme treatment, typically ranges from 3.5 to 12.0% protein, 0.1 to 5.0% lactose, 0.6 to 1.1% minerals, 0.2 to 0.8% calcium and 0 (no fat) to 4% (full fat) milk fat. Following the lactase treatment of a product, the quantity of lactose in the product is significantly reduced. In certain embodiments of the invention, the quantity of lactose in the enzyme-treated product is reduced to zero.

Table 13 illustrates representative DESIGNER™ compositions prepared using the isolated milk components of the present invention.

TABLE 13

| Product | Fat (%) | Protein (%) | Lactose (%) | Solids-not-fat (%) | Minerals (%) |
|---|---|---|---|---|---|
| DESIGNER ® Skim Milk | ≤0.2 | 5.7-6.1 | 1.5-1.85 | 8.34-8.45 | 0.7-0.8 |
| DESIGNER ® Reduced-Fat Milk | 1.85-2.1 | 5.7-6.1 | 1.5-1.85 | 8.34-8.45 | 0.7-0.8 |
| DESIGNER ® Reduced-Lactose Milk | 1.85-2.1 | 5.7-6.1 | 0.1-1.0 | 8.34-8.45 | 0.7-0.8 |
| DESIGNER ® Reduced-Lactose Skim Milk | ≤0.2 | 5.7-6.1 | 0.1-1.0 | 8.34-8.45 | 0.7-0.8 |
| DESIGNER ® Lactose free reduced fat milk | 1.85-2.1 | 4.2-4.5 | 3.0-3.3 | 8.35-8.55 | 0.7-0.8 |

Additional exemplary compositions that can be prepared from the separated components of the claimed invention are set forth below.

A dairy composition consisting of 2.0% butter fat, 6.2% protein, 0.75% minerals and 1.8% lactose, prepared by combining 62% of re-filtered UF retentate of skim milk, 4.75% cream, 4.66% lactose concentrate (NF retentate) and 29% RO retentate.

A dairy composition consisting of 0.2% butter fat, 6.2% protein, 0.75% minerals and 1.8% lactose, prepared by combining 62% of re-filtered UF retentate of skim milk, 4.66% lactose concentrate (NF retentate) and 33.34% RO retentate.

A dairy composition consisting of 0.2% butter fat, 6.25 protein, 0.75% minerals and 1.8% lactose, prepared by combining 62% of re-filtered UF retentate of skim milk, 4.66% lactose concentrate (NF-retentate) and 33.34% NF permeate prepared from UF skim milk permeate.

A dairy composition consisting of 2.0% butter fat, 6.25% protein, 0.75% minerals and 1.8% lactose, prepared by combining 62% of re-filtered UF retentate of skim milk, 4.75% cream, 4.66% lactose concentrate (NF-retentate) and 29% NF permeate prepared from UF skim milk permeate.

A dairy composition consisting of 0.2% butter fat, 6.2% protein, 0.75% minerals and 1.6% lactose, prepared by combining 33.5% of UF retentate of skim milk (6× concentrated) and 66.5% of NF-permeate of UF skim milk permeate.

A dairy composition consisting of 2.0% butter fat, 6.2% protein, 0.75% minerals and 1.6% lactose, where in said composition is prepared by combining 33.5% of UF retentate of skim milk (6× concentrated), 4.75% cream and 61.75% NF permeate of UF-skim milk permeate.

A dairy composition consisting of 0.2% butter fat, 6.2% protein, 0.75% minerals and 1.6% lactose, where in said composition is prepared by combining 33.5% of UF retentate of skim milk (6× concentrated) and 66.5% RO-concentrate of nanofiltration permeate of UF skim milk permeate.

A dairy composition consisting of 2.0% butter fat, 6.2% protein, 0.75% minerals and 1.6% lactose, wherein said composition is prepared by combining 33.5% of UF retentate of skim milk (6× concentrated) 4.75% cream and 61.75% RO retentate of nanofiltration permeate of UF skim milk permeate.

In order to increase the sweetness of the blended dairy compositions, the compositions were treated with lactase enzyme. Treatment with lactase hydrolysed the lactose in the compositions to produce galactose and glucose. As a result of the hydrolysis, the sweetness of the treated product is greater relative to that of the untreated product because of the presence of glucose in the treated product. For example, the hydrolysis of 100% of the lactose in UF retentate (having approximately 5% lactose) results in an increase in the sweetness of the treated product equivalent to 1.0% (w/v) of sucrose. Similarly, hydrolysis of 30%, 60% and 90% of the lactose originally present is equivalent to adding 0.3%, 0.6% and 0.9% (w/v) sucrose, respectively. See Advanced Dairy Chemistry, Vol. 3, p. 108, by R. R. Mahoney, Chapman & Hall, 2d ed.

A universal scale for the measurement of sweetness has been developed that correlates the level of sweetness to a known quantity of sucrose. For example, a 2% sucrose sample is designated as having a sweetness value of "2". Similarly, a 5% sucrose sample is designated as having a sweetness value of "5", a 10% sucrose sample is designated as having a sweetness value of "10", and a 15% sucrose sample is designated as having a sweetness value of "15".

One method used in the evaluation of the sweetness of a sample is the magnitude estimation procedure. In this procedure, samples are evaluated for sweetness in comparison with standard sucrose solutions. See J. of Dairy Science, Vol. 61 (1978), p. 542. The tester first tastes the control sucrose solution. After rinsing with water between samples, the judges taste the test samples. Each tester then estimates the sweetness intensity of the sample relative to the control sucrose solution by indicating whether the sample is more or less sweet than the control sucrose solution. If additional sucrose control solutions are available, the tester can perform the magnitude estimation procedure with the additional sucrose control solutions in the same manner as with the first sucrose control solution.

The process of milk component fractionation as set forth in the present invention is a continuous on-line process. At any given time, the milk components that are derived from the fractionation processes of the invention, and used in the preparation of the compositions of the invention, are obtained from the same batch of milk that initialy entered the fractionation system.

Although this invention has certain preferred embodiments, it will be obvious to those skilled in the art that various changes and modifications may be made therein without departing from the invention, and all such changes and modifications are intended to fall within the true spirit and scope of the invention.

What is claimed is:

1. A method for making a dairy composition, the method comprising:
    subjecting milk to an ultrafiltration step to produce a UF permeate fraction and a UF retentate fraction;
    subjecting the UF permeate fraction to a nanofiltration step to produce a NF permeate fraction and a NF retentate fraction;
    combining the UF retentate fraction with the NF permeate fraction to form a mixture;
    subjecting the mixture to a diafiltration step to produce a DF permeate fraction and a DF retentate fraction;
    combining the DF retentate fraction with the NF retentate fraction to form a blended composition; and
    treating the blended composition with lactase enzyme to form a dairy composition having a lactose content of 0.1 to 1 wt. %.

2. The method claim 1, wherein the combining the UF retentate fraction with the NF permeate fraction to form a mixture further comprises adding water to the NF permeate fraction and the UF retentate fraction.

3. The method of claim 1, wherein the DF retentate fraction is combined with the NF permeate fraction and the UF retentate fraction to from the blended composition.

4. The method of claim 1, wherein the DF retentate fraction is combined with the NF permeate fraction and the NF retentate fraction to from the blended composition.

5. The method of claim 1, wherein the DF retentate fraction is combined with the UF permeate fraction to form the blended composition.

6. The method of claim 1, wherein the DF retentate fraction is combined with the UF permeate fraction and the NF permeate fraction to form the blended composition.

7. The method of claim 1, wherein the DF retentate fraction is combined with the UF retentate fraction and the UF permeate fraction to form the blended composition.

8. The method of claim 1, wherein the method further comprises heat treating the blended composition prior to treating the blended composition with the lactase enzyme.

9. The method of claim 1, wherein the blended composition has a fat content of less than or equal to 0.2 wt. %.

10. The method of claim 1, wherein the blended composition has a fat content of from 1.85 to 2.1 wt. %.

11. The method of claim 1, wherein the blended composition has a protein content of from 5.7 to 6.1 wt. %.

12. The method of claim 1, wherein the blended composition has a protein content of from 4.2 to 4.5 wt. %.

* * * * *